United States Patent
Jiang et al.

(10) Patent No.: US 8,078,711 B2
(45) Date of Patent: Dec. 13, 2011

(54) FRONT-END GATEWAY UNIT FOR REMOTE ECOLOGICAL ENVIRONMENT MONITORING SYSTEM

(75) Inventors: Joe-Air Jiang, Taipei (TW); En-Cheng Yang, Taipei (TW); Chwan-Lu Tseng, Taipei (TW); Chia-Pang Chen, Taipei (TW); Tzu-Shiang Lin, Taipei (TW); Yung-Cheng Wu, Taipei (TW); Chen-Ying Lin, Taipei (TW); Chu-Ping Tseng, Taipei (TW); Shih-Hsiang Lin, Taipei (TW); Chih-Sheng Liao, Taipei (TW); Shih-Hao Szu, Taipei (TW); Chung-Wei Yen, Taipei (TW); Kuang-Chang Lin, Taipei (TW); Zong-Siou Wu, Taipei (TW); Fu-Ming Lu, Taipei (TW)

(73) Assignee: National Taiwan University, Taipei (TW)

( * ) Notice: Subject to any disclaimer, the term of this patent is extended or adjusted under 35 U.S.C. 154(b) by 640 days.

(21) Appl. No.: 12/194,925

(22) Filed: Aug. 20, 2008

(65) Prior Publication Data

US 2009/0252086 A1   Oct. 8, 2009

(30) Foreign Application Priority Data

Apr. 3, 2008   (TW) .............................. 97112114 A

(51) Int. Cl.
*G06F 15/173*   (2006.01)
(52) U.S. Cl. .............. 709/223; 340/539.26; 340/870.11; 370/401
(58) Field of Classification Search .......... 709/223–224; 340/539.26, 870.11; 370/401, 466
See application file for complete search history.

(56) References Cited

U.S. PATENT DOCUMENTS

| | | | |
|---|---|---|---|
| 7,822,852 B2 * | 10/2010 | Qi et al. ........................ | 709/224 |
| 2007/0058634 A1 * | 3/2007 | Gupta et al. ................... | 370/392 |
| 2008/0016440 A1 * | 1/2008 | Liu et al. ....................... | 715/700 |
| 2008/0071899 A1 * | 3/2008 | Odaka et al. ................... | 709/223 |
| 2008/0136606 A1 * | 6/2008 | Kwon et al. ............. | 340/286.02 |
| 2008/0137624 A1 * | 6/2008 | Silverstrim et al. ........... | 370/338 |
| 2010/0007483 A1 * | 1/2010 | Oh et al. ....................... | 340/521 |
| 2010/0201516 A1 * | 8/2010 | Gelvin et al. ............ | 340/539.26 |

\* cited by examiner

*Primary Examiner* — Abdullahi Salad

(57) ABSTRACT

A front-end gateway unit is designed for integration to a remote ecological environment monitoring system that is equipped with a wireless sensor network (WSN) system installed at a remote site, such as a farmland or a garden, for the purpose of allowing the WSN system to exchange data with a back-end host server via a wireless communication system. The front-end gateway unit is characterized by the capability of using either the WSN system or a built-in sensing module for collecting ecological data, and the capability of combining geographical location data in the ecological data. This feature allows the collection of a comprehensive set of ecological data (including geographical location, temperature, humidity, sunlight data, wind speed, and pest number) for transfer to the back-end host server, such that research/management personnel at the local site can conveniently browse these ecological data and learn the ecological conditions of the remotely monitored area.

10 Claims, 4 Drawing Sheets

FRONT-END GATEWAY UNIT FOR REMOTE ECOLOGICAL ENVIRONMENT MONITORING SYSTEM

BACKGROUND OF THE INVENTION

1. Field of the Invention

This invention relates to ecological environment monitoring technology, and more particularly, to a front-end gateway unit which is designed for integration to a remote ecological environment monitoring system that is equipped with a wireless sensor network (WSN) system installed at a remote site (front-end site), such as a farmland or a garden, for the purpose of allowing the WSN system to exchange data with a back-end host server.

2. Description of Related Art

In agricultural research and management, it is an important task to monitor the ecological environment of a farmland used to cultivate crops such as fruits, rice, and vegetables. The main purpose is to collect a set of ecological data that are considered as vital factors that would significantly affect the cultivation and growth of crops on the farmland. These ecological data include, for example, number of clustered pests (such as fruit flies) per unit area, temperature, humidity, sunlight intensity, and wind speed, to name a few. Research personnel can analyze these ecological data for effective management of the farmland to achieve optimized crop production.

Traditionally, the collection of ecological data from farmlands is carried out by human labor work. For example, the number of pests per unit area is collected by firstly using a net to capture a group of pests within a certain area, and then visually counting the total number of pests being captured in the net, and finally using statistical methods to estimate the total number of pests within the entire area. All these works are carried out by human labor. For collection of climate-related ecological data (temperature, humidity, sunlight intensity, wind speed, etc.), this task is traditionally carried out by installing temperature sensors, humidity sensors, sunlight intensity sensors, wind speed sensors on the farmland; and the sensed data are visually inspected and manually recorded by the research/management personnel. The collected ecological data are then analyzed and compiled by the research personnel into written reports. These written reports are then used as references for management of the farmland to achieve optimized crop production. For example, if the number of pests per unit area is considered to be overly large, pest-killing or expelling means should be provided; if temperature/humidity is too high, conditioning means should be installed; and if the wind speed is too high, wind-shielding means should be installed.

One apparent drawback to the labor-based work for ecological data collection is that it is quite tedious, laborious, and time-consuming for the research/management personnel to carry out. Moreover, if the farmland is located at a remote site, such as a distant mountain or rural place, the research/management personnel might have to spend lots of time and cost in the travel to the farmland.

SUMMARY OF THE INVENTION

It is therefore an objective of this invention to provide a front-end gateway unit for a remote ecological environment monitoring system which can be used for installation at a front-end site where a sensor network is installed, so that the ecological data collected by the sensor network, such as geographical position, temperature, humidity, sunlight intensity, wind speed, and pest number, can be forwarded to a back-end host server for research/management personnel to conveniently browse the gathered ecological data at the local site.

The front-end gateway unit according to the invention is designed for installation at a remote site (front-end site), such as a farmland or a garden, for the purpose of allowing a WSN system to exchange data with a back-end host server.

In architecture, the front-end gateway unit according to the invention comprises: (A) a wireless sensor network (WSN) linking module; (B) a geographical location detection module; (C) data transmission module; (D) a wireless communication linking module; and (E) a wireless sensor network (WSN) management control module; and can further optionally The front-end gateway unit according to the invention is characterized by the capability of using either the WSN system or a built-in sensing module for collecting ecological data, and the capability of combining geographical location data in the ecological data. This feature allows the collection of a comprehensive set of ecological data (including geographical location, temperature, humidity, sunlight data, wind speed, and pest number) for transfer to the back-end host server, such that research/management personnel at the local site can conveniently browse these ecological data and learn the ecological conditions of the remotely monitored area.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The front-end gateway unit for remote ecological environment monitoring system according to the invention is disclosed in full details by way of preferred embodiments in the following with reference to the accompanying drawings.

Application of the Invention

Figure 1:
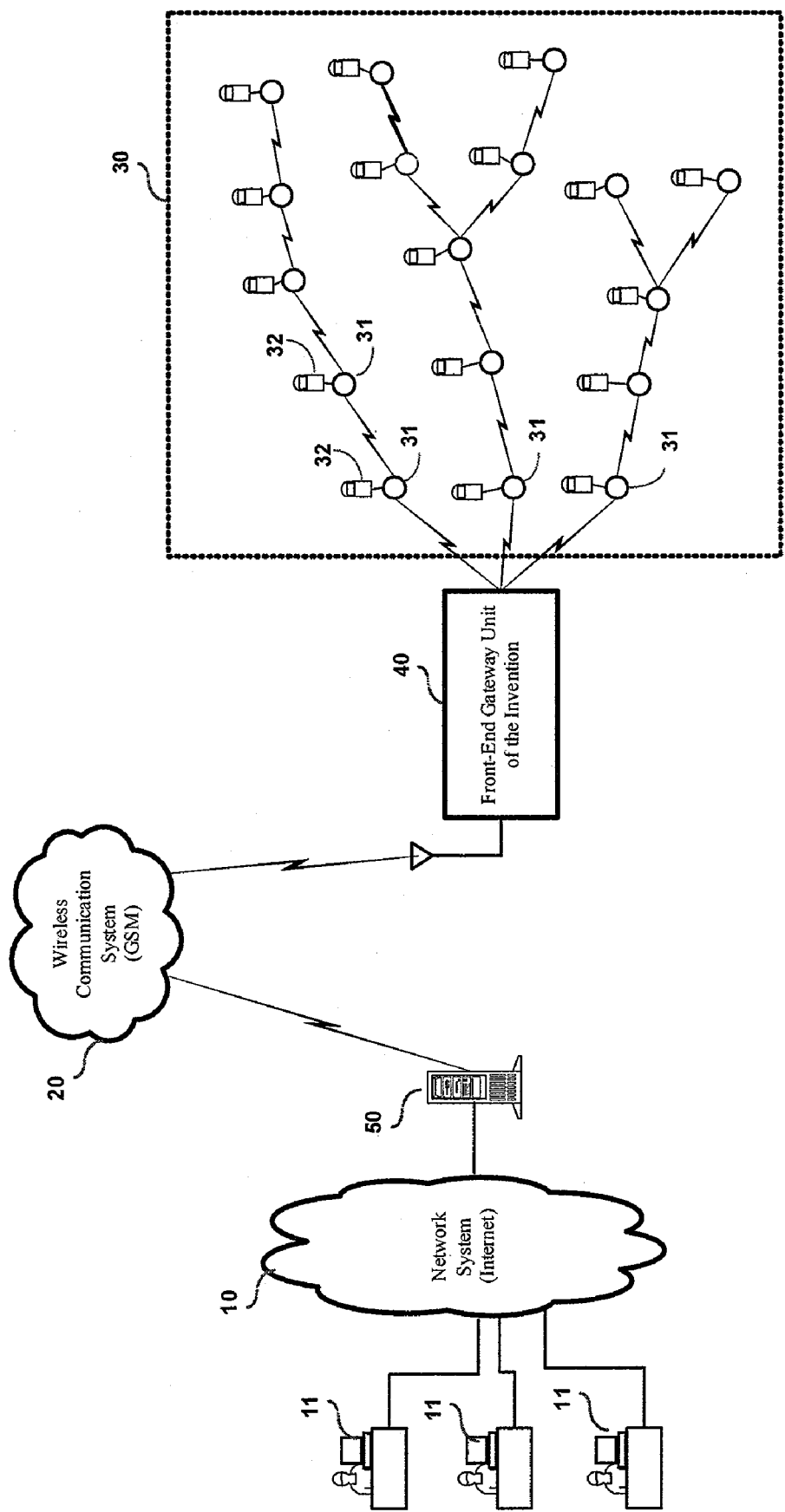
FIG. 1 is a schematic diagram showing an application example of the front-end gateway unit according to the invention.

FIG. 1 is a schematic diagram showing the application of the front-end gateway unit according to the invention (which is here encapsulated in a box indicated by the reference numeral 40). As shown, the front-end gateway unit of the invention 40 is designed for integration to a network-based ecological environment remote monitoring system, which is for example used for remote monitoring of the ecological environment of a farmland or a garden, and whose architecture includes a network system 10, a wireless communication system 20, a front-end sensor network system 30 (which is composed of a plurality of sensor nodes 31), and a back-end host server 50.

In practice, for example, the network system 10 can be implemented with the Internet, an intranet, an extranet, or a LAN (Local Area Network) system, which allows a network workstation 11 to be linked to the back-end host server 50, so that the user of the network workstation 11 (i.e., research/management personnel) can use the network workstation 11 to browse the ecological data that have been uploaded by the front-end gateway unit of the invention 40 to the back-end host server 50.

The wireless communication system 20 can be implemented with, for example, the standard GSM (Global System for Mobile Communications) system or other type of wireless communication system, which allows the front-end gateway unit of the invention 40 to communicate and exchange data with the back-end host server 50 in a wireless manner.

The sensor network system 30 can be a cabled or a wireless type of sensor network, and preferably a WSN (Wireless Sensor Network) system. In the implementation with WSN, the sensor network is composed of a clustered array of sensor nodes 31, such as a microprocessor-based sensor device under control of the TinyOS operating system (which is a well-known operating system for WSN node devices). Each TinyOS-based sensor node 31 is capable of sensing the temperature, humidity, and sunlight intensity in the surrounding ecological environment; and can be further externally coupled with a pest-counting device 32 capable of counting the number of a cluster of pests, such as fruit flies, by luring them into a trapping container and sensing the number of pests that have entered into the trapping container.

It is to be noted that, beside the above-mentioned application example shown in FIG. 1, the front-end gateway unit of the invention 40 can also be used for various other purposes, such as for integration to other types of remote monitoring systems.

Function of the Invention

Figure 2:
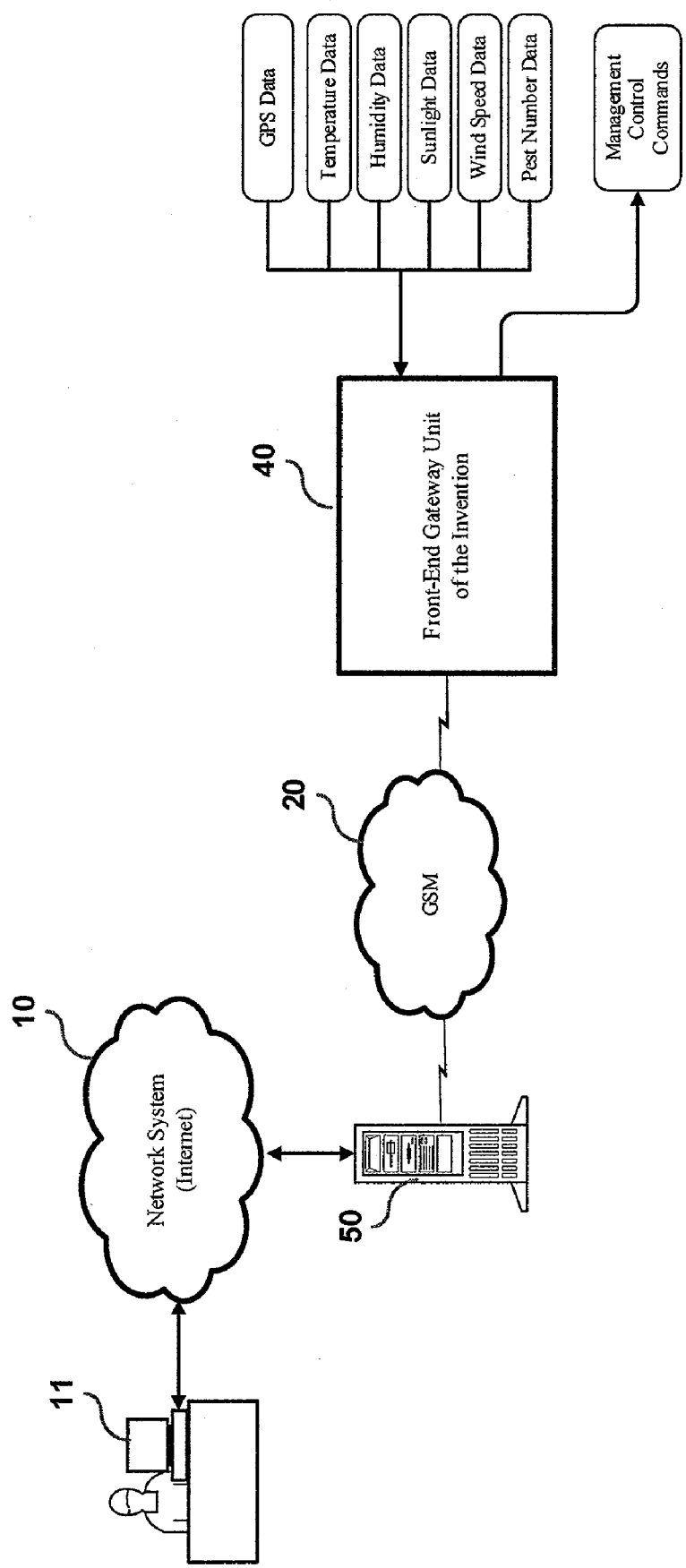
FIG. 2 is a schematic diagram showing the functional model of the front-end gateway unit according to the invention.

FIG. 2 shows the functional model of the front-end gateway unit of the invention 40. As shown, the front-end gateway unit of the invention 40 is used to provide a gateway function between the remotely-situated front-end WSN system 30 and the locally-situated back-end host server 50 via the GSM system 20. In operation, the front-end gateway unit of the invention 40 collects a set of ecological data, including, but not limited to, geographical position, temperature, humidity, sunlight intensity, wind speed, and number of pests (such as the number of fruit flies), and transfers these ecological data via the GSM system 20 to the back-end host server 50. In a bidirectional manner, the front-end gateway unit of the invention 40 can receive a set of management control commands via the GSM system 20 from the back-end host server 50 for management control of the WSN system 30.

Architecture of the Invention

Figure 3:
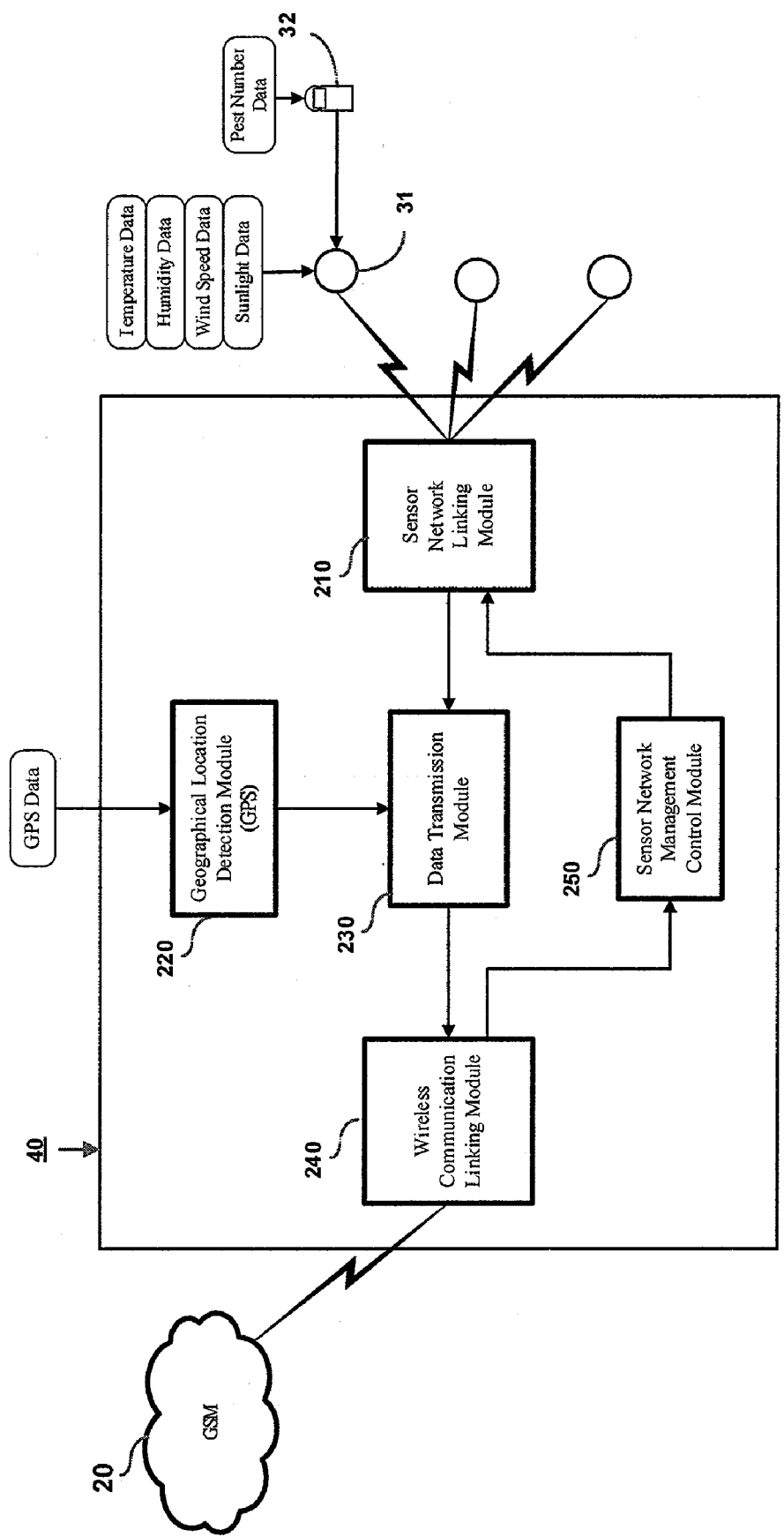
FIG. 3 is a schematic diagram showing a first preferred embodiment of the architecture of the front-end gateway unit according to the invention.

As shown in FIG. 3, in architecture, the front-end gateway unit of the invention 40 comprises: (A) a sensor network linking module 210; (B) a geographical location detection module 220; (C) a data transmission module 230; (D) a wireless communication linking module 240; and (E) a sensor network management control module 250; and can further optionally comprise: (F) a built-in ecological environment sensing module 260. Firstly, the respective attributes and functions of these constituent elements of the invention are described in details in the following.

Sensor Network Linking Module 210

The sensor network linking module 210 is used for linking the front-end gateway unit of the invention 40 to each of the sensor nodes 31 in the WSN system 30 for communication and data exchange with each sensor node 31; i.e., for receiving each set of ecological data sensed by each sensor node 31 and transferring management control commands to each sensor node 31 for management control of the operations of each sensor node 31.

In practice, for example, the sensor network linking module 210 utilizes a multihop linking and routing scheme for linking all the sensor nodes 31 in the WSN system 30 into a predefined network topology, which allows each sensor node 31 to transfer a sensed set of ecological data (i.e., temperature, humidity, sunlight intensity, wind speed, and pest number) via a multihop manner to the front-end gateway unit of the invention 40. Since the multihop linking and routing scheme is well-known art in WSN technology, detailed description thereof will not be given in this specification.

Geographical Location Detection Module 220

The geographical location detection module 220 is implemented with, for example, the standard GPS (Global Positioning System) technology for detecting the geographical location where the front-end gateway unit of the invention 40 is located to thereby generate a set of geographical location data in electronic form for indicating the geographical location of the installed site of the front-end gateway unit of the invention 40. Since GPS is a well-known and widely used technology, detailed description thereof will not be given in this specification.

Data Transmission Module 230

The data transmission module 230 is used for transmission of a collection of data including the GPS data generated by the geographical location detection module 220 and each set of ecological data (i.e., temperature data, humidity data, sunlight data, wind speed data, and pest number data) that are received by the WSN linking module 210 from all the sensor nodes 31 of the WSN system 30. The collected data are first converted to a specific transmission data format that is compliant with the wireless communication protocol used by the wireless communication system 20.

In practice, in the case of the wireless communication system 20 being a GSM-compliant system, the transmission data format used by this data transmission module 230 can be, for example, the standard SMS (Short Message Service) or GPRS (General Packet Radio Service) data format for GSM data communication.

Wireless Communication Linking Module 240

The wireless communication linking module 240 is used for linking the front-end gateway unit of the invention 40 in a wireless manner to the GSM system 20 (specifically, to a GSM subscriber's network address assigned to the back-end host server 50) for data exchange with the back-end host server 50 via the GSM system 20. When linked, the wireless communication linking module 240 is capable of bidirectional data exchange with the back-end host server 50 by transferring each set of ecological data in SMS or GPRS format via the GSM system 20 to the back-end host server 50 and receiving each set of WSN management control commands issued by the back-end host server 50.

Sensor Network Management Control Module 250

The sensor network management control module 250 is capable of performing a set of user-specified or host-specified management control actions on the WSN system 30 in response to a set of management control commands from the back-end host server 50 received via the GSM system 20. In practice, these management control actions include, for example, power on/off control, clock synchronization, and sensor node initialization.

Built-In Ecological Environment Sensing Module 260

Figure 4:
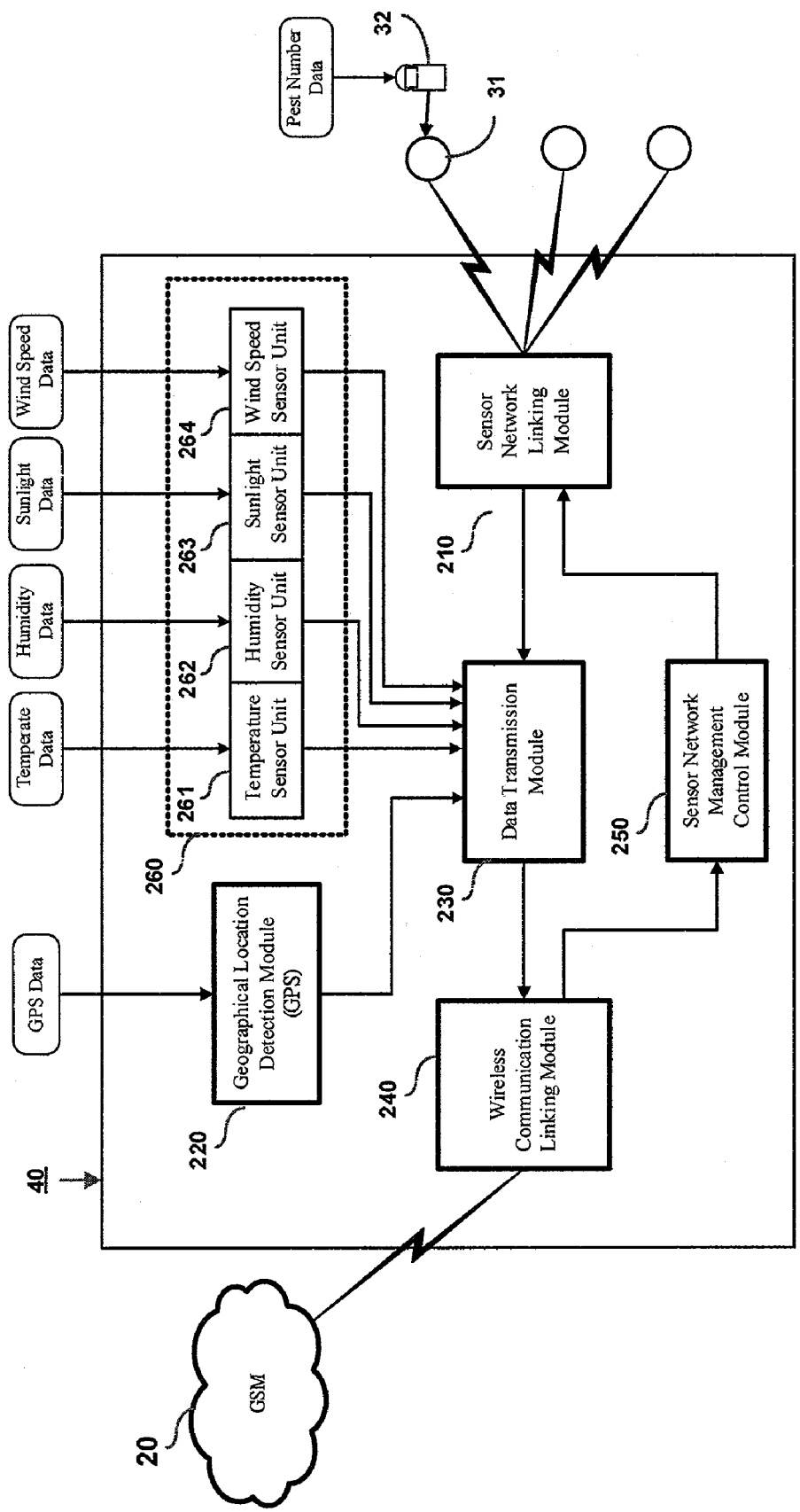
FIG. 4 is a schematic diagram showing a second preferred embodiment of the architecture of the front-end gateway unit according to the invention.

The built-in ecological environment sensing module 260 includes, for example, a temperature sensor unit 261, a humidity sensor unit 262, a sunlight sensor unit 263, and a wind speed sensor unit 264 as shown in FIG. 4, which are capable of sensing the temperature, humidity, sunlight, and wind speed conditions of the surrounding ecological environment.

In the case that each sensor node 31 of the WSN system 30 is capable of sensing temperature, humidity, sunlight, and wind speed, and the research/management personnel wants to collect widespread ecological data from multiple locations in a wide area, the built-in ecological environment sensing module 260 can be disabled and unused.

On the other hand, in the case that each WSN sensor node 31 is unequipped with the sensing capabilities for temperature, humidity, sunlight, and wind speed, or in the case that these ecological data can be collected from just one location in the monitored area, then this built-in ecological environment sensing module 260 can be enabled to collect a single set of ecological data about temperature, humidity, sunlight, and wind speed that generically represent the ecological conditions of the monitored area.

Operation of the Invention

The following is a detailed description of a practical application example of the front-end gateway unit of the invention 40 in actual operation. In this application example, it is assumed that the front-end gateway unit of the invention 40 is used as a component for integration to a network-based ecological environment remote monitoring system shown in FIG. 1 which is used for the remote monitoring of a farmland for collecting a set of data about the ecological conditions of the farmland, including temperature, humidity, sunlight intensity, wind speed, and number of clustered pests (such as fruit flies).

In application, the front-end gateway unit of the invention 40 has two operation modes, where the first operation mode is to use the sensor nodes 31 of the WSN system 30 for sensing temperature, humidity, sunlight, and wind speed; while second operation mode is to use the built-in ecological environment sensing module 260 for providing these sensing functions.

Under the first operation mode, each sensor node 31 of the WSN system 30 will sense its surrounding environment for acquiring a set of ecological data (i.e., temperature, humidity, sunlight intensity, wind speed, and number of clustered pests), and then transfer these data in a multihop manner by routing via one or more other sensor nodes 31 to the sensor network linking module 210 for handling by the front-end gateway unit of the invention 40. The received ecological data are then combined with the GPS data generated by the geographical location detection module 220 for further handling by the data transmission module 230.

Under the second operation mode, as shown in FIG. 4, each sensor node 31 of the WSN system 30 will only transfer the pest number data (generated by the pest-counting device 32) to the front-end gateway unit of the invention 40; and meanwhile the temperature, humidity, sunlight, and wind speed data are detected and generated respectively by the temperature sensor unit 261, the humidity sensor unit 262, the sunlight sensor unit 263, and the wind speed sensor unit 264 of the built-in ecological environment sensing module 260. The pest number data and the temperature, humidity, sunlight, and wind speed data are then combined with the GPS data generated by the geographical location detection module 220 for further handling by the data transmission module 230.

The data transmission module 230 then receives the combined collection of data (GPS data, temperature data, humidity data, sunlight data, wind speed data, and pest number data) and convert them into a specific transmission data format that is compliant with the GSM system 20, such as the SMS data format. The SMS-formatted ecological data are then transmitted via the wireless communication linking module 240 to the GSM system 20 for forwarding to the back-end host server 50.

When the back-end host server 50 receives the SMS-formatted data from the GSM system 20, it first decodes and retrieves the embedded ecological data (i.e., GPS data, temperature data, humidity data, sunlight data, wind speed data, and pest number data), then stores these ecological data to a database, and automatically produce a set of Web pages based on these ecological data for posting to a specific Web site, so that any research/management personnel can browse these ecological data by linking his/her network workstation 11 via the network system 10 to the Web site hosted by the back-end host server 50.

If the research/management personnel wants to control the operations of the sensor nodes 31 of the WSN system 30, such as power on/off control, clock synchronization, and sensor node initialization, the research/management personnel can use his/her network workstation 11 to command the back-end host server 50 to issue a set of related management control commands. These commands are then transferred via the GSM system 20 to the front-end gateway unit of the invention 40, where the sensor network management control module 250 will control the operations of the sensor nodes 31 of the WSN system 30 based on these commands and via the sensor network linking module 210.

In conclusion, the invention provides a front-end gateway unit for remote ecological environment monitoring system, which is characterized by the capability of using either the WSN system or a built-in sensing module for collecting ecological data, and the capability of combining geographical location data in the ecological data. This feature allows the collection of a comprehensive set of ecological data (including geographical location, temperature, humidity, sunlight data, wind speed, and pest number) for transfer to the back-end host server, such that research/management personnel at the local site can conveniently browse these ecological data and learn the ecological conditions of the remotely monitored area. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A front-end gateway unit for use with a remote ecological environment monitoring system that is equipped with a Wireless Sensor Network (WSN), a wireless communication system, and a back-end host server, wherein the WSN includes at least one WSN sensor node producing a set of ecological data by sensing the surrounding ecological environment where the WSN sensor node is installed, and the front-end gateway unit providing a front-end gateway function for the WSN to exchange data with the back-end host server via the wireless communication system;

the front-end gateway unit comprising:

a sensor network linking module, which is used for linking to the WSN for data exchange with each sensor node in the WSN to receive each set of ecological data acquired by each sensor node;

a geographical location detection module detecting the geographical location where the front-end gateway unit is located to thereby generate a set of geographical location data in electronic form;
a data transmission module converting a combined collection of data including each set of ecological data from the WSN and the geographical location data from the geographical location detection module into a specific data transmission format based on a wireless communication protocol that is compliant with the wireless communication system;
a wireless communication linking module linking to the wireless communication system for transmitting the formatted data from the data transmission module to the wireless communication system; and
a sensor network management control module performing a set of management control actions on the WSN in response to a set of management control commands issued by the back-end host server and received via the wireless data communication system,
wherein the data transmission format utilized by the data transmission module for transmission of the ecological data is Short Message Service (SMS), and the WSN sensor node is a TinyOS-based sensor node.

2. The front-end gateway unit of claim 1, wherein the WSN sensor node in the WSN is responsible for sensing a set of ecological data including temperature, humidity, sunlight, and pest number collectively.

3. The front-end gateway unit of claim 1, wherein the WSN sensor node in the WSN is responsible for gathering the data of number of clustered pests.

4. A front-end gateway unit for use with a remote ecological environment monitoring system that is equipped with a wireless sensor network (WSN), a wireless communication system, and a back-end host server, wherein the WSN includes at least one sensor node producing a set of ecological data by sensing the surrounding ecological environment where the sensor node is installed, and the front-end gateway unit providing a front-end gateway function for the WSN to exchange data with the back-end host server via the wireless communication system;
the front-end gateway unit comprising:
a wireless sensor network linking module, which is used for linking to the WSN for data exchange with each sensor node in the WSN to receive each set of ecological data acquired by each sensor node;
a built-in ecological environment sensing module providing a set of built-in ecological environment sensing functions for generating a set of ecological data;
a geographical location detection module detecting the geographical location where the front-end gateway unit is located to thereby generate a set of geographical location data in electronic form;
a data transmission module converting a combined collection of data including each set of ecological data from the WSN, a set of environmental parameters from the built-in ecological environment sensing module, and the geographical location data from the geographical location detection module into a specific data transmission format based on a wireless communication protocol that is compliant with the wireless communication system;
a wireless communication linking module linking to the wireless communication system for transmitting the formatted data from the data transmission module to the wireless communication system; and
a wireless sensor network management control module performing a set of management control actions on the WSN in response to a set of management control commands issued by the back-end host server and received via the wireless data communication system,
wherein the data transmission format utilized by the data transmission module for transmission of the ecological data is Short Message Service (SMS), and the WSN sensor node is a TinyOS-based sensor node.

5. The front-end gateway unit of claim 4, wherein the sensor network linking module utilizes a multihop linking and routing scheme for linking all the sensor nodes in the WSN.

6. The front-end gateway unit of claim 4, wherein the built-in ecological environment sensing module includes:
a temperature sensor unit for acquiring temperature data about the surrounding ecological environment.

7. The front-end gateway unit of claim 4, wherein the built-in ecological environment sensing module includes:
a humidity sensor unit for acquiring humidity data about the surrounding ecological environment.

8. The front-end gateway unit of claim 4, wherein the built-in ecological environment sensing module includes:
a sunlight sensor unit for acquiring sunlight data about the surrounding ecological environment.

9. The front-end gateway unit of claim 4, wherein the built-in ecological environment sensing module includes:
a wind speed sensor unit for acquiring wind speed data about the surrounding ecological environment.

10. The front-end gateway unit of claim 4, wherein the geographical location detection module is implemented with standard GPS (Global Positioning System) technology.

* * * * *